US006492898B1

(12) United States Patent
Sabbattini et al.

(10) Patent No.: US 6,492,898 B1
(45) Date of Patent: Dec. 10, 2002

(54) DATA TRANSMISSION SYSTEM FOR PIPELINES

(75) Inventors: Bruno Sabbattini, Wettingen (CH); Josef Lehmann, Waldshut-Tiengen (DE); Paul Rudolf, Villigen (CH); Daniel Matter, Brugg (CH)

(73) Assignee: ABB Research Ltd, Zurich (CH)

( * ) Notice: Subject to any disclaimer, the term of this patent is extended or adjusted under 35 U.S.C. 154(b) by 182 days.

(21) Appl. No.: 09/635,528

(22) Filed: Aug. 9, 2000

(30) Foreign Application Priority Data

Aug. 23, 1999 (DE) ........................................ 199 39 941

(51) Int. Cl.[7] .............................................. H04M 11/04

(52) U.S. Cl. ........................... 340/310.01; 340/310.02; 340/310.03; 340/870.09; 340/870.18

(58) Field of Search ....................... 340/310.01–310.07, 340/870.09, 870.18; 702/38; 324/713

(56) References Cited

U.S. PATENT DOCUMENTS 2,023,857 A * 12/1935 Satterlee et al. ....... 340/310.02
3,551,890 A * 12/1970 Silverman ............. 340/310.07
3,860,912 A * 1/1975 Romans ................. 340/870.18
3,978,469 A * 8/1976 Schaad et al. ......... 340/310.05
4,090,170 A * 5/1978 Lincklaen-Arriens et al. ... 367/134
4,400,782 A 8/1983 Ishikawa et al. .............. 702/38
5,241,301 A * 8/1993 Rivola et al. ............... 340/660
5,587,707 A * 12/1996 Dickie et al. .......... 340/870.09
5,785,842 A * 7/1998 Speck ..................... 205/777.5
6,107,811 A * 8/2000 Caudill et al. .............. 324/713

FOREIGN PATENT DOCUMENTS

DE 132817 11/1978
DE 4023467 A1 1/1992
DE 9412921 11/1994
DE 4335772 A1 4/1995

* cited by examiner

*Primary Examiner*—Benjamin C. Lee
(74) *Attorney, Agent, or Firm*—Burns, Doane, Swecker & Mathis, L.L.P.

(57) ABSTRACT

In a data transmission system for a pipeline which is electrically conductive at least in sections, the pipeline itself forms a data line. For this purpose, a coupling element is present for the modulation of electrical signals onto a potential of the pipeline. A cost-effective data transmission system is created which can be used in remote regions.

9 Claims, 2 Drawing Sheets

DATA TRANSMISSION SYSTEM FOR PIPELINES

This application claims priority under 35 U.S.C. §§119 and/or 365 to Appln. No. 199 39 941.7 filed in Germany on Aug. 23, 1999; the entire content of which is hereby incorporated by reference.

BACKGROUND OF THE INVENTION

1. Field of the Invention

The invention relates to a method for data communication along a pipeline and to a data transmission system for a pipeline.

2. Background of the Invention

In order to control and monitor pipelines, communication signals such as monitoring signals of pump stations, control commands or filling level indications have to be communicated to stations or central control stations arranged along the pipeline. In known systems, this data communication is effected either via telephone lines, by radio wave communication or via dedicated pilot cables laid along the pipeline. However, equipment and installations which are intended to be connected by the communication system are often situated at remote and/or not easily accessible locations. These regions are often not covered by the telephone network and, in some instances, also do not permit a pilot cable to be laid. Moreover, all three types of communication systems are associated with relatively high costs, because of the connection costs in the case of the telephone line, because of the additionally necessary installations in the case of radio wave communication and the pilot cable, and also because of the increased outlay on maintenance in the case of the pilot cable.

U.S. Pat. No. 5,785,842 discloses a data communication system for pipelines which is limited to the communication of data regarding corrosion protection. A monitoring device is connected to an active cathodic corrosion protection unit, and it conducts values from the latter via a satellite to a central control station.

Cathodic corrosion protection units of this type are disclosed in the prior art. They exploit the fact that pipelines which transport gaseous or liquid media are usually laid in a manner such that they are electrically insulated relative to the ground potential. This insulation can be attained by means of an insulation layer applied to the pipeline or its pipes, for example in the form of coats of paint, bitumenization or plasticization. For insulation purposes, the pipeline can also be embedded in sand and gravel or be laid on electrically insulated supports above the ground.

Two types of cathodic corrosion protection units are known. A first type, the passive corrosion protection unit, has sacrificial electrodes, which are produced from a suitable material and are laid in the ground. These sacrificial electrodes are connected to one another and, at grounding points spaced apart from one another, to the pipeline. On account of an electrochemical series, a potential which causes a current flow is produced. As a result, the sacrificial electrodes corrode, but not the material of the pipeline. In a second type, the active corrosion protection unit, a metallic pipeline is connected to an electrical energy source in order to raise the pipeline to an electrical protective potential. For this purpose, the corrosion protection unit has a rectifier fed by an AC voltage. The rectifier is connected to the pipeline by one pole and to ground by an opposite pole, as a result of which defined grounding points are present in this case as well. A long pipeline normally has a plurality of such active corrosion protection units arranged distributed over its length.

SUMMARY OF THE INVENTION

The object of the invention is to provide a method for data communication along a pipeline and also a data transmission system for a pipeline which enable cost-effective communication even in remote regions.

According to the invention, the pipeline itself is used as a data line by electrical signals being modulated onto a potential of the pipeline and being transmitted via the pipeline, which is electrically conductive at least in sections.

The electrical signals are preferably transmitted onto the pipeline at defined grounding points thereof, the electrical signals being modulated onto a DC protective signal applied to the pipeline in the case of active cathodic corrosion protection. By virtue of the decoupling of the DC protective signal, its average value and hence the corrosion protection remain unburdened by the electrical modulation signal.

In order at least approximately to prevent the modulation signal from flowing away to ground, a blocking element, for example a filter or an inductance, is preferably present.

In order to avoid interference to the best possible extent, it is possible, in particular for long transmission links, to use a frequency range of 1–100 kHz, preferably 4–10 kHz, for the modulation signals. The choice of a high frequency range, preferably above 1 kHz, means that ions of the pipeline do not have a high degree of mobility, so that no corrosion is caused. This allows the sign of the transmission signal or of the resulting instantaneous voltage to be momentarily changed.

It is advantageous that even existing pipelines can be retrofitted with the data transmission system according to the invention.

BRIEF DESCRIPTION OF THE DRAWINGS

The subject matter of the invention is explained in more detail below using preferred exemplary embodiments which are illustrated in the accompanying drawings, in which.

DETAILED DESCRIPTION OF THE PREFERRED EMBODIMENTS

Figure 1:
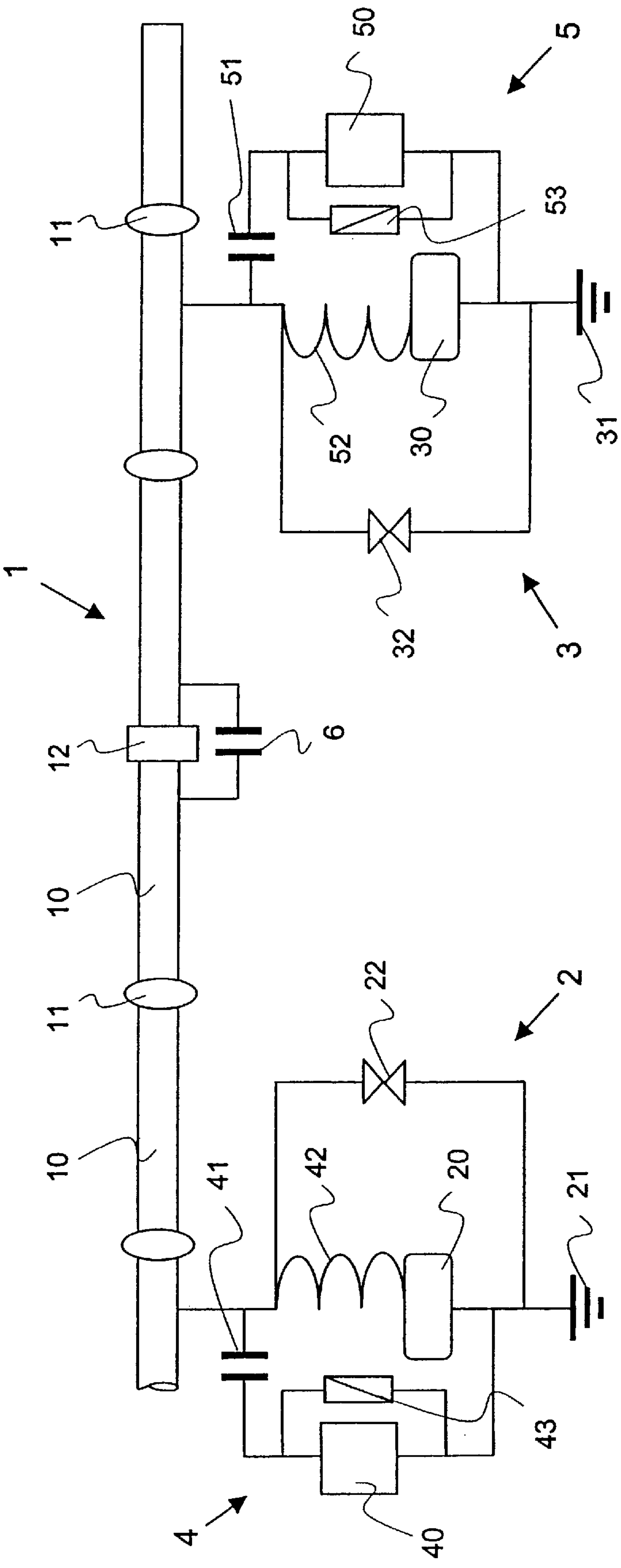
FIG. 1 shows a schematic illustration of part of a pipeline with a data transmission system according to the invention.

FIG. 1 shows part of a pipeline 1 and a transmission system according to the invention with a transmitting unit 4 and a receiving unit 5 in accordance with a first embodiment.

The pipeline 1 comprises a plurality of electrically conductive pipes 10, preferably made of steel, which are connected to one another by means of connecting elements 11, in particular welding sleeves. In this case, the connecting elements 11 are electrically insulated relative to ground but the connection is electrically conductive. A plurality of pipes 10 form a common electrically conductive section of the pipeline 1, the individual sections being connected to one another by means of electrically insulating connecting pieces 12. The electrical insulation of the individual sections ensures that a current profile on the pipeline is exactly defined.

Mutually electrically insulated sections of the pipeline 1 are connected to one another by means of a bridging element 6, which constitutes an inhibitor for DC voltage but is transmissive to an AC voltage signal, with the result that data signals can flow from one section to the next. The bridging element 6 is preferably a capacitive coupler.

Corrosion protection units are connected to the pipeline 1. They are active corrosion protection units 2, 3, as are disclosed in the prior art, in this exemplary embodiment. A corrosion protection unit 2, 3 of this type is preferably present for each section of the pipeline 1. Each corrosion protection unit 2, 3 has a rectifier 20, 30, which is connected to a pipe 10 of the pipeline 1 at a first pole and is connected to rounding 21, 31 at a second pole. The rectifier 20, 30, which is fed with AC voltage, raises the pipeline 1 to a predetermined cathodic protective potential, with the result that a defined DC voltage is present at each section of the pipeline 1. Each corrosion protection unit 2, 3 preferably has an overvoltage protection element 22, 32 in order to dissipate possible overvoltages. The overvoltage protection element 22, 32 is connected in parallel with the rectifier 20, 30 and dissipates charges to ground when a predetermined maximum voltage is exceeded.

In FIG. 1, the two active corrosion protection units 2, 3 are respectively connected to a transmitting and/or receiving unit 4, 5. Although the corrosion protection units 2, 3 are adjacent in FIG. 1, in between there are generally a number of traditional corrosion protection units which are not coupled with the data communication, said units preferably likewise having a blocking element 42, 52, which will be described further below.

The transmitting unit transmits data via the pipeline by modulating an AC voltage signal onto the DC voltage of the pipeline 1. For this purpose, modulation algorithms which are known in data transmission are used. The receiving unit demodulates the AC voltage signal and forwards it to a receiver.

Usually, the transmitting unit 3 and the receiving unit 4 are constructed identically and perform both transmission and reception functions. The transmitting and/or receiving unit 4, 5 has a transmitter 40 and/or receiver 50, preferably in the form of a modem, and also a coupling element and/or decoupling element 41, 51. The transmitter and/or receiver 40, 50 forms a linking element to a transmitting and/or receiving station (not illustrated), the nature of which may differ depending on the data to be communicated. The coupling and/or decoupling element 41, 51 serves for coupling in and/or coupling out modulation signals. It preferably comprises a capacitive coupler or a filter which forms a high impedance for the DC voltage signal of the rectifier 10, 20 and which is connected between modem and rectifier 10, 20. As is illustrated in FIG. 1, the transmitting and/or receiving unit 4, 5 preferably has a blocking element 42, 52, which is arranged between coupling and/or decoupling element 41, 51 and rectifier 20, 30. In a preferred embodiment, the blocking element is an inductance or a filter which constitutes a high impedance in the frequency range of the modulation signals but is transmissive to DC voltage. Consequently, these blocking elements 42, 52 at least approximately prevent the electrical signals that are modulated on from flowing away to ground.

In the preferred embodiment described here, the pipeline 1 is provided with a termination element 43, 53 forming the characteristic impedance of the pipeline 1. In this case, at least the first and last transmitting and/or receiving unit 4, 5 of a pipeline 1 has such a termination element 43, 53. In FIG. 1, the termination elements 43, 53 are each connected in parallel with the modems 40, 50.

Figure 2:
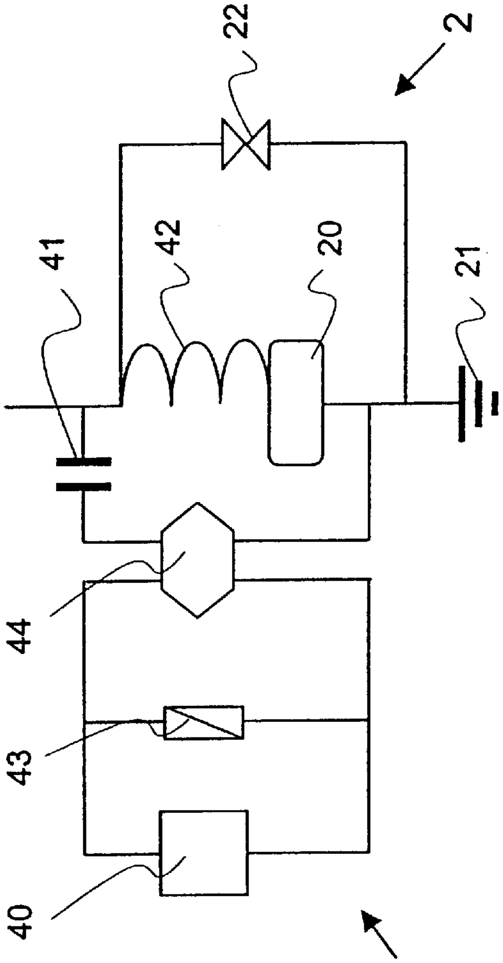
FIG. 2 shows a schematic illustration of a transmitting and/or receiving unit in a second embodiment.

In a second preferred embodiment as shown in FIG. 2, the modem 40 is matched to the characteristic impedance of the pipeline 1. For this purpose, a matching element 44 is present, which may be a simple transformer or a complex network. Analogously to FIG. 1, termination elements 43 can be connected in parallel with the matching element 44 or, as illustrated here, in parallel with the modem 40.

Figure 3:
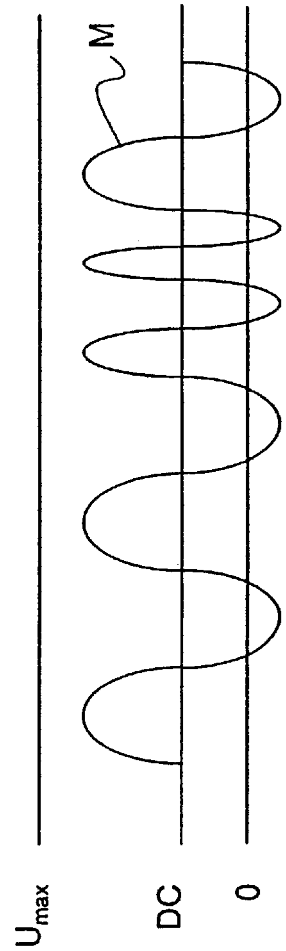
FIG. 3 shows a graphical illustration of an electrical signal in relation to the protective voltage.

FIG. 3 illustrates an electrical modulation signal M, as is modulated onto the potential of the pipeline 1 from the transmitter 40 via the coupling element 41. Furthermore, a bottom line 0 identifies the ground potential, a middle line DC identifies the potential of the active cathodic corrosion protection and a top line $U_{max}$ identifies a response threshold of the overvoltage protection element 22, 32. As can be seen in FIG. 3, the average value of the signals that modulated on is generally zero, with the result that the average value of the entire transmission signal that is passed onto the pipeline corresponds to the potential of the active cathodic corrosion protection. In order to increase the signal power to be coupled in, the electrical signal M that is modulated on may perfectly well assume values below the ground potential, but it typically lies below the response threshold $U_{max}$ of the overvoltage protection element 22, 32.

Possible frequencies for the modulation signal are limited at the lower end by the interference level which is present on such pipelines. The origin of the interference level is typically 50 Hz or 60 Hz and harmonics thereof. An upper limit is formed by attenuation experienced by the modulation signal on the pipeline. Therefore, the modulation frequencies typically lie in a range of 1–100 kHz, preferably 4–10 kHz. In the frequency range specified, the mobility of the ions in the pipeline is too small for them to be able to cause corrosion. For short distances, moreover, the upper frequency limit may be even higher, values of up to a few MHz being used. This enables the data communication rate to be increased. In a preferred variant of the method, AC signals are used as electrical modulation signals, whose RMS value exceeds by far the value of the cathodic protective voltage. As a result, the electrical signals can be communicated over relatively large distances, for example of up to a few 10 km.

In the preferred exemplary embodiment illustrated here, the electrical signal is modulated onto the DC voltage signal of an active cathodic corrosion protection. In another embodiment (not illustrated here), the corrosion protection is effected passively with a sacrificial electrode. In this case, too, the electrical signal is once again modulated on at the grounding points defined by the position of the sacrificial electrodes. In this case, too, a blocking element which is intended to prevent the electrical signal that is modulated on from flowing away is preferably present between coupling element and grounding of the sacrificial electrode.

According to the invention, the pipeline itself forms the data line for communicating data. This creates a cost-effective data transmission system which can also be used in remote regions. The system can be used for pipelines over land, pipelines sunk in the ground, and also for underwater pipelines, in the latter case the ground connections being replaced by an outer insulated sheath.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

M Electrical signal
1 Pipeline
10 Pipe
11 Connecting element
12 Insulating connecting piece
2, 3 Cathodic corrosion protection unit
20, 30 Rectifier
21, 31 Grounding
22, 32 Overvoltage protection element
4, 5 Transmitting and/or receiving unit
40, 50 Transmitter/receiver (modem)
41, 51 Coupling and/or decoupling element
42, 52 Blocking element
43, 53 Termination element
44 Matching element
6 Bridging element

What is claimed is:

1. A method for data communication along a pipeline which is electrically conductive at least in sections, comprising:

modulating electrical signals onto a potential of the pipeline via a coupling unit connected to a cathodic corrosion protection unit; and transmitting the electrical signals that are modulated onto the pipeline by at least approximately preventing the electrical signals from flowing away to ground.

2. The method as claimed in claim 1, wherein the electrical signals are transmitted onto the pipeline at grounding points of said pipeline.

3. The method as claimed in claim 1, wherein the electrical signals are modulated via an active cathodic corrosion protection unit.

4. The method as claimed in claim 1, wherein electrical signals with a frequency range of 1–100 kHz are modulated.

5. The method as claimed in claim 1, wherein electrical signals with a frequency range of 4–10 kHz are modulated.

6. A data transmission system for a pipeline which is electrically conductive at least in sections, comprising:

a data line formed by the pipeline; and a coupling element for modulation of electrical signals onto a potential of the pipeline, wherein the coupling element is connected to a cathodic corrosion protection unit; and a blocking element, forming an inhibitor for the electrical signals that are modulated, between the coupling element and the cathodic corrosion protection unit to at least approximately prevent the electrical signals that are modulated from flowing away to ground.

7. The data transmission system as claimed in claim 6, wherein, in each case, two sections of the pipeline which are electrically insulated from one another are connected to one another by a bridging element, which communicates the electrical signals that are modulated onto the pipeline.

8. The data transmission system as claimed in claim 6, wherein the coupling element is connected to an active cathodic corrosion protection unit.

9. The data transmission system as claimed in claim 6, wherein the coupling element forms an inhibitor for a DC voltage signal of the cathodic corrosion protection unit.

* * * * *